United States Patent
Fan et al.

(10) Patent No.: US 11,428,671 B2
(45) Date of Patent: Aug. 30, 2022

(54) ARRANGEMENT FOR NON-DESTRUCTIVE TESTING AND A TESTING METHOD THEREOF

(71) Applicant: NANYANG TECHNOLOGICAL UNIVERSITY, Singapore (SG)

(72) Inventors: Zheng Fan, Singapore (SG); Danylo Lisevych, Singapore (SG); Xudong Yu, Singapore (SG)

(73) Assignee: Nanyang Technological University, Singapore (SG)

( * ) Notice: Subject to any disclaimer, the term of this patent is extended or adjusted under 35 U.S.C. 154(b) by 110 days.

(21) Appl. No.: 16/966,777

(22) PCT Filed: Feb. 1, 2019

(86) PCT No.: PCT/SG2019/050058
§ 371 (c)(1),
(2) Date: Jul. 31, 2020

(87) PCT Pub. No.: WO2019/151952
PCT Pub. Date: Aug. 8, 2019

(65) Prior Publication Data
US 2021/0041399 A1   Feb. 11, 2021

(30) Foreign Application Priority Data

Feb. 1, 2018   (SG) ............................ 10201800876X

(51) Int. Cl.
*G01N 29/04* (2006.01)

(52) U.S. Cl.
CPC ..... *G01N 29/043* (2013.01); *G01N 2291/044* (2013.01); *G01N 2291/048* (2013.01);
(Continued)

(58) Field of Classification Search
CPC ........... G01N 29/043; G01N 2291/106; G01N 2291/048; G01N 2291/0425;
(Continued)

(56) References Cited

U.S. PATENT DOCUMENTS 5,404,755 A * 4/1995 Olson ...................... G01N 3/48
                                                              73/12.12
5,460,046 A * 10/1995 Maltby ................. G01N 29/09
                                                              73/623
(Continued)

FOREIGN PATENT DOCUMENTS

CN        2615666 Y       5/2004
CN      104122331 A      10/2014
(Continued)

OTHER PUBLICATIONS

"Standard Guide for Magnetic Particle Testing," ASTM International, pp. 1-48, 2015.
(Continued)

*Primary Examiner* — Jacques M Saint Surin
(74) *Attorney, Agent, or Firm* — Seed Intellectual Property Law Group LLP

(57) ABSTRACT

An arrangement for non-destructive testing of a component part, which may include a first end surface and a second opposite end surface. The arrangement may include a plurality of discrete piezoelectric transduction elements arranged in a circular array on the first end surface, and an electric wave signal transmitting and receiving unit electrically coupled to the piezoelectric transduction elements. The electric wave signal transmitting and receiving unit may be able to generate an electric excitation wave signal and to receive an electric response wave signal. The piezoelectric transduction elements may deform, upon an application of the electric excitation wave signal, in an in-phase shearing motion parallel to the first end surface and in respective
(Continued)

tangential direction with respect to the circular array so as to generate a corresponding structure-borne wave in the component part at the first end surface such that said structure-borne wave can propagate in the component part.

16 Claims, 4 Drawing Sheets

(52) U.S. Cl.
CPC ............... *G01N 2291/0425* (2013.01); *G01N 2291/106* (2013.01); *G01N 2291/2691* (2013.01)

(58) Field of Classification Search
CPC ..... G01N 2291/044; G01N 2291/2691; G01N 2291/0258
USPC .......................................................... 73/598
See application file for complete search history.

(56) References Cited

U.S. PATENT DOCUMENTS

| | | | |
|---|---|---|---|
| 5,708,208 A | 1/1998 | Bonitz | |
| 5,970,798 A | 10/1999 | Gleman et al. | |
| 6,813,950 B2* | 11/2004 | Glascock | G01N 29/221 |
| | | | 73/622 |
| 6,822,443 B1* | 11/2004 | Dogaru | G01R 33/093 |
| | | | 324/235 |
| 8,477,905 B2* | 7/2013 | Belassel | G01N 29/043 |
| | | | 378/72 |
| 9,007,064 B2* | 4/2015 | Widhalm | G01R 27/14 |
| | | | 324/426 |
| 9,279,755 B2* | 3/2016 | Widhalm | G01R 31/385 |
| 9,510,806 B2* | 12/2016 | Smith | G01S 7/52079 |
| 10,317,353 B2* | 6/2019 | Khosravani | G01R 27/08 |
| 10,322,512 B2* | 6/2019 | Zanella | B33Y 80/00 |
| 10,365,249 B2* | 7/2019 | Nagai | G01N 29/221 |
| 2006/0106550 A1* | 5/2006 | Morin | G01N 29/11 |
| | | | 702/34 |
| 2010/0050778 A1 | 3/2010 | Herley et al. | |
| 2011/0088473 A1 | 4/2011 | Nelson et al. | |
| 2011/0146412 A1 | 6/2011 | Hoering et al. | |
| 2012/0222485 A1 | 9/2012 | Stickel | |
| 2018/0113097 A1* | 4/2018 | Bueno | G01N 29/28 |

FOREIGN PATENT DOCUMENTS

| | | |
|---|---|---|
| FR | 2 957 418 A1 | 9/2011 |
| WO | 2012/172136 A1 | 12/2012 |

OTHER PUBLICATIONS

"Standard Practice for Liquid Penetrant Testing," ASTM International, pp. 1-11, 2016.

Cawley, "Practical Long Range Guided Wave Inspection—Applications to Pipes and Rail," NDE2002, Dec. 5-7, 2002, 16 pages.

Moles et al., "Phased Arrays for Detecting Cracking in Bolts," 6$^{th}$ International Conference on NDE in Relation to Structural Integrity for Nuclear and Pressurized Components, Oct. 2007, Budapest, Hungary (10 pages).

Wilcox et al., "Long Range Inspection of Rail Using Guided Waves," *AIP Conference Proceedings* 657:236-243, 2003 (9 pages).

* cited by examiner

ARRANGEMENT FOR NON-DESTRUCTIVE TESTING AND A TESTING METHOD THEREOF

CROSS-REFERENCE TO RELATED APPLICATIONS

The present application claims the benefit of the Singapore patent application No. 10201800876X filed on 1 Feb. 2018, the entire contents of which are incorporated herein by reference for all purposes.

TECHNICAL FIELD

Various embodiments generally relate to an arrangement for non-destructive testing and a non-destructive testing method. In particular, various embodiments generally relate to an arrangement for non-destructive testing and a non-destructive testing method for a component part, e.g. a structural bolt.

BACKGROUND

Bolted joints are one of the most common connection elements used in engineering structural applications, which primarily provide continuity of the structure and transfer of internal loads from one member to another. Due to their extensive use in the industry, the bolt types, material selection, dimensions, and other specifications have been well documented in various international standards. However, under fluctuating load conditions, the structural bolts are susceptible to fatigue failure. Cracks can be initiated in highly stressed regions of the bolt and may grow to a critical size subjected to continued cyclic loading, causing the complete separation of the fastened structural parts. Furthermore, in a bolted joint containing multiple bolts, once one of them failed, the remaining bolts have to withstand the redistributed load during their service life, wherein fatigue cracking can further be easily introduced. Therefore, it is essential to periodically monitor the health condition of bolts during the in-service use to detect the possible cracking or corrosion timely in case they propagate deep in the material and ultimately lead to catastrophic failure of the entire structure.

Typical non-destructive testing (NDT) methods to inspect structural bolts include magnetic particle inspection, dye penetrants, radiography, eddy current, and ultrasonic testing. These approaches can be applied to identify defects in the bolt which may occur in the manufacturing process or during the in-service use.

In the magnetic particle testing, the test specimen has to be magnetized, and the magnetic particles, either in a dry or wet suspended form, are then applied to the surface of the bolt. Due to the magnetic flux leakage at discontinuities of the structure, the particles will be accumulated in the defective area, thus forming a visible indication. This technique is easy to implement and possesses high sensitivity to even very small defects, which, however, is merely applicable to ferromagnetic materials and can only detect surface and subsurface defects. Dye penetrant is another economic method for bolt inspection, in which the entire surface of the test component will be covered with penetrants. Upon adequate dwell time, the excess penetrant is removed, and a developer is subsequently applied to make the defect indication visible to the inspector under ultraviolet or white light. This approach may be applicable to all non-ferrous and ferrous materials but can only locate the surface-breaking defects. Additionally, performing the test on rough surfaces (e.g. thread) or on porous materials, will make it difficult to remove any excessive penetrant and could result in false damage indications. However, these two low-cost and efficient NDT techniques require direct access to the whole bolt structure. Thus, they can only be used to the in-process control and final product examination, but are difficult to be used for the in-service maintenance as in-situ inspection, because the installed bolts cannot be frequently disassembled from the joint structure to provide the required exposure. Other NDT methods such as radiography and eddy current testing are also time-consuming and expensive for such in-situ inspection of bolted joints.

Among the available NDT techniques, conventional ultrasonic testing methods may be most suited for the blot inspection during the in-service use, because they are portable, free of removing bolts from the installed position, and have high penetration depth as well as good sensitivity to small defects. The test may be carried out either by a single transducer in pulse-echo mode or with two transducers in through-transmission mode. Typically, an ultrasonic transducer is placed in direct contact with one end of the bolt, and the transmitted ultrasonic waves propagate along the bolt. Defects occurring in the propagation path will act as reflectors to reflect some of the energy travelling in the medium, and the location of the defect can be determined by the arrival time of the reflected waves and the wave velocity in the material.

The conventional ultrasonic tests are based on a local inspection and are only capable of examining a single line along the axis of the bolt, which require scanning transducers in a point-by-point manner over the bolt end in order to achieve the adequate coverage of the area of interest. Such tests are thus time-consuming and tedious for damage detection, and the interpretation of received signals has proven to be difficult in the presence of geometric echoes (e.g. bolt threads, back wall), mode conversions, and reflections by cracks. Nevertheless, the conventional ultrasonic testing can provide sufficient accuracy in measuring the bolt length.

In recent years, advanced ultrasonic phased array techniques have also been employed in the bolt inspection, where the array probe, either coupled with normal beam wedge or not, is mounted in a bespoke jig on the bolt head, and a small angle sectorial scan (also called azimuthal scan or swept angle scan) is performed to obtain the structural information in the beam plane. Encoded rotation of the probe is then applied to cover the complete circumference of the bolt. Compared to conventional ultrasonic tests, the encoded phased array testing can provide increased detection capabilities, however, its performance doesn't suffice when long bolts are encountered, where larger beam steering angles will be needed for full length coverage.

Accordingly, there is a need for a more effective and efficient arrangement for non-destructive testing and non-destructive testing method.

SUMMARY

According to various embodiments, there is provided an arrangement for non-destructive testing of a component part. The arrangement may include the component part to be tested, which may include a first end surface and a second end surface opposite the first end surface. The arrangement may further include a plurality of discrete piezoelectric transduction elements arranged in a circular array on the first end surface of the component part. The arrangement may further include an electric wave signal transmitting and receiving unit electrically coupled to the plurality of discrete piezoelectric transduction elements. The electric wave signal transmitting and receiving unit may be able to generate an electric excitation wave signal and to apply the said electric excitation wave signal to the piezoelectric transduction elements. The electric wave signal transmitting and receiving unit may be able to receive an electric response wave signal from the piezoelectric transduction elements and to process the said electric response wave signal. According to various embodiments, the piezoelectric transduction elements may be configured and arranged to deform, upon an application of the electric excitation wave signal, in an in-phase shearing motion parallel to the first end surface and in respective tangential direction with respect to the circular array so as to generate a corresponding structure-borne wave in the component part at the first end surface thereof such that that said structure-borne wave can travel from the first end surface to the second end surface so as to be reflected by the second end surface and returned as a response wave from the second end surface to the first end surface. The response wave can be received and correspondingly converted by the piezoelectric transduction elements into the electric response wave signal to be received and processed by the electric wave signal transmitting and receiving unit.

According to various embodiments, there is provided a non-destructive testing method. The method may include arranging a plurality of discrete piezoelectric transduction elements in a circular array on a first end surface of a cylindrical component part to be tested. The cylindrical component part to be tested may include the first end surface and a second end surface opposite the first end surface. The method may further include operating an electric wave signal transmitting and receiving unit electrically coupled to the plurality of discrete piezoelectric transduction elements to generate an electric excitation wave signal and to apply the said electric excitation wave signal to the piezoelectric transduction elements in a manner to deform the piezoelectric transduction elements in an in-phase shearing motion parallel to the first end surface and in respective tangential direction with respect to the circular array so as to generate a corresponding structure-borne wave in the component part at the first end surface thereof such that that said structure-borne wave can travel from the first end surface to the second end surface so as to be reflected by the second end surface and returned as a response wave from the second end surface to the first end surface. The response wave can be received and correspondingly converted by the piezoelectric transduction elements into the electric response wave signal to be received and processed by the electric wave signal transmitting and receiving unit. The structure-borne wave may be generated in form of a fundamental torsional guide wave.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to an arrangement for non-destructive testing and a non-destructive testing method. In particular, various embodiments generally relate to an arrangement for non-destructive testing and a non-destructive testing method for a component part, e.g. structural bolts. The component part may be a structural connection component part. According to various embodiments, there is provided an arrangement and method for non-destructive testing (NDT) of the component part, such as the structural bolt, using ultrasonic guided waves.

Figure 1A:
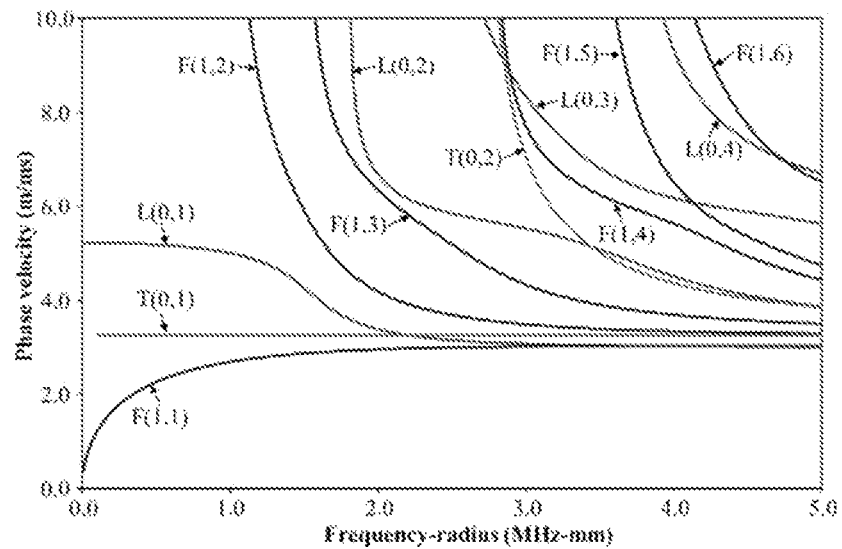
FIG. 1A and FIG. 1B show dispersion curves of guided modes in a cylindrical rod waveguide, with the phase or group velocity of modes being a function of the product of the frequency and the radius.
Figure 1B:
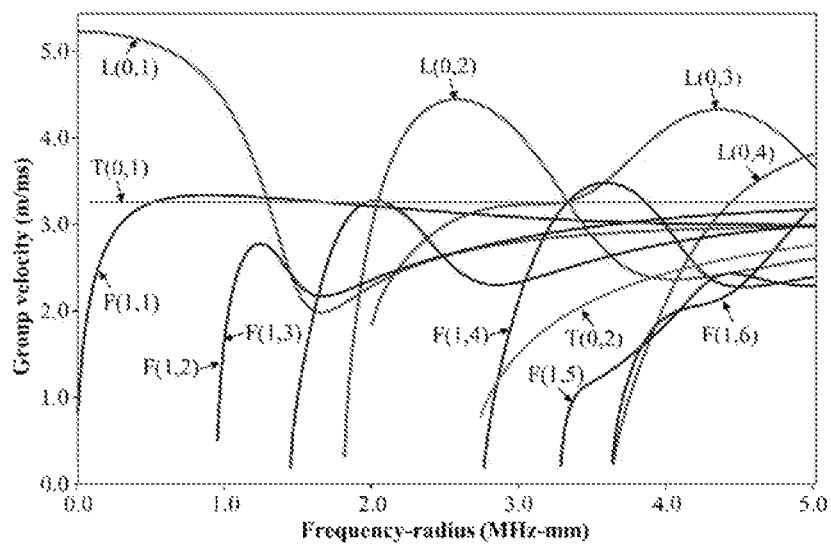

According to various embodiments, ultrasonic guided wave testing may be an effective alternative for the in-situ inspection of component parts, for example long structural bolts, since it potentially may allow for rapid screening over significant distances with a fixed transducer position and remote inspection of structures with difficult access. It may achieve 100% thickness coverage of the waveguide (for example, the component part) and may thus be able to detect major detects occurring anywhere in the structure (for example, the component part). There has been successful commercial deployment of guided waves for long-range inspection of pipelines and rails, while such guided wave techniques have not been commercialized for bolt inspection (or inspection for component part). This may be due to the limited transducer position provided by bolt heads and feet (e.g. internal hex socket bolt) (or the limited area of the end surfaces of the component part), which disfavors efficient generation of guided wave modes. More importantly, the major problem to be overcome is dispersion and the presence of multiple modes in guided waves. Guided waves are generally dispersive, which means their phase or group velocity varies with frequency. Phase velocity of a guided wave denotes the rate at which individual crests of the wave move, while group velocity describes the propagating speed of a guided wave packet (or envelope) with components of similar frequencies. FIG. 1A and FIG. 1B show dispersion curves of guided modes in a cylindrical rod waveguide (or a cylindrical body or a cylindrical structure), with the phase or group velocity of modes being a function of the product of the frequency and the radius. The dispersion curves may be used to predict how much dispersion will occur to a given wave packet. Any excited wave of a finite time period would have a certain frequency bandwidth, and each frequency component in the wave packet may travel at a different group velocity. If the difference of velocities over the frequency range of interest is large, different frequency components may arrive at different times, which will result in distortion of the shape of a wave packet as it propagates. By contrast, if the group velocities are very close over the generated frequency range, the wave packet may maintain a similar shape throughout its entire propagation.

In practical long-range non-destructive testing (NDT)/ structural health monitoring (SHM) applications, the favorable guided modes ought to be little-dispersive so that the detected signals may be simpler to interpret. Guided waves in cylindrical systems may be classified into three types of modes according to the wave structure. Longitudinal (L) modes are longitudinal axially symmetric modes; torsional (T) modes predominantly possess circumferential particle displacement; flexural (F) modes are non-axially symmetric bending modes. Among these modes, the fundamental torsional guided wave mode T(0,1) is entirely non-dispersive, which makes post-processing of signals less complex than other dispersive modes. Meanwhile, there is only one torsional axisymmetric mode at low frequencies so that the transduction would be less complicated than that for L or F modes, where the transducer system must be carefully designed to suppress the unwanted concurrent excitation of other modes in the same wave family.

For the reasons stated above, various embodiments may utilize the fundamental torsional guided wave for detecting damage in a component part, such as a long structural bolt etc.

Various embodiments may be particularly useful for in-situ damage detection in installed component parts, such as structural bolts, which may only require access to one end of the bolt for transduction and may be free of dissembling the bolt from the fastener joint.

Various embodiments may be particularly well suited to the long-range inspection of the component parts, such as bolts. According to various embodiments, the transmitted guided wave itself may be capable of propagating significant distances in the component parts, such as bolts, achieving full coverage of the entire component part so that major defects occurring anywhere in the component part may be detected.

Furthermore, in various embodiments, an ultrasonic transducer, which may include ultrasonic sensors or piezoelectric transduction elements, may be permanently attached to the ends of the component part (e.g. the bolt), which may facilitate the real-time structural health monitoring (SHM) of the installed component parts, or bolted joints. According to various embodiments, the arrangement for non-destructive testing may form a structural connection component, wherein the component part is an elongated part, optionally a bolt, which extends along a longitudinal axis and wherein the component part has first and second end surfaces formed by first and second axial end surfaces of the elongated part. Further, the ultrasonic transducer may be permanently disposed on the end surfaces of the component part.

According to various embodiments, there is provided an apparatus for ultrasonic non-destructive testing of component part, such as structural bolts, said apparatus may include:

a circular array of trapezoid shaped piezoelectric elements (or piezoelectric transduction elements), which may produce pure shear motion along a circumference direction subjected to an applied electric field; and an ultrasonic pulser/receiver unit (or an electric wave signal transmitting and receiving unit) to generate pulse-like excitation signals (or electric excitation wave signals) at the required frequency and to receive the reflected waves by distal end of the bolt and by defects (or to receive the electric response wave signals converted by the trapezoid shaped piezoelectric transduction elements from response waves received from the structural component part and/or the defects in the structural component part).

According to various embodiments, said array of piezoelectric elements (or piezoelectric transduction element) may be coupled to a head (or a foot) of the structural component part, such as the structural bolt. They may be positioned in a circular configuration, and each trapezoidal patch (or piezoelectric transduction element) may be preferably configured with optimized dimensions to maximize the contact area between the piezoelectric elements (or piezoelectric transduction elements) and a planar surface at an end of the component part (or a bolt end), particularly when internal socket bolt heads may be encountered. All these patches (or piezoelectric transduction elements) may be connected in parallel, so that they may generate in-phase shear motion when the electric field is applied, and the discrete shear motions in the circumference of the component part (or the bolt) may constructively lead to the generation of torsional guided waves.

According to various embodiment, ultrasonic signals for NDT/SHM purposes may be transmitted in a substantially non-dispersive manner, such that precise timing measurements may be made (i.e. accurate location of the defect may thus be determined). The generated fundamental torsional mode may propagate along the component part (or the bolt) without exhibiting dispersion so that the received signals may keep the same shape as the incident wave. Meanwhile, the torsional mode may have little attenuation, which may enable significant inspection distances.

According to various embodiments, the ultrasonic generator component (or the ultrasonic transducer) may be adaptable to different geometries of the end surface of the component part (or bolt head geometries). Therefore, the ultrasonic transducer may include multiple discrete piezoelectric patches (or piezoelectric transduction elements), configured along the circumference of the end surface of the component part (or the bolt). According to various embodiments, the sizes of each patch (or piezoelectric transduction element) may be adjusted to achieve adequate contact area and optimal transmission efficiency. Additionally, according to various embodiments, the number of piezoelectric patches (or piezoelectric transduction elements) used may suppress the flexural modes that may be excited together with the fundamental torsional mode.

According to various embodiments, the said piezoelectric elements (or piezoelectric transduction elements) may be coupled to the end surface of the component part (or the bolt end) by either of the following ways: (i) a bonded connection; and (ii) a mechanical fixing and ultrasound transmissive couplant. According to various embodiments, such couplings between the ultrasonic transducer and the accessible end of the waveguide (i.e. the component part) may promote efficient energy transfer between the two. The bonding connection according to various embodiments may include adhesive joining, welding, soldering, and other bonding techniques. The coupled ultrasonic transducers may operate in pulse-echo configuration, so that the piezoelectric elements (or piezoelectric transduction elements) may be used as both transmitter and receiver. The received signals (or electric response wave signal) may then be acquired and analyzed by the said ultrasonic pulser/receiver unit (or the electric wave signal transmitting and receiving unit), giving indications of the structural integrity.

Various embodiments may allow the installed component parts (or structural bolts) to be inspected periodically for SHM purposes during the in-service life. To achieve this, the said array of piezoelectric elements (or piezoelectric transduction elements) may be permanently attached to the end surface of the component part, or the bolt head, (e.g. by adhesive bonding) and leave the associated wire ends accessible from a remote site. Multiple data collections from the same sensors at the same location may thus be compared and analyzed to capture the changes in the regularly monitored component parts (or bolts), by merely connecting the pulser/receiver unit (or the electric wave signal transmitting and receiving unit) to these wires. Various embodiments may also allow more accurate separation of environmental effects (e.g. ambient temperature variation, stress, and liquid loading) from real defects. Moreover, such tests may be performed by less trained personnel (only requiring a fully qualified inspector when the sensor or transducer is first installed).

Various embodiments will herein be described by means of inspecting an example component part in the form of a structural bolt, with reference to the accompanying drawings.

Various embodiments utilize ultrasonic torsional guided waves for damage detection in component parts, e.g. structural bolts. As described earlier, compared to conventional ultrasonic testing, various embodiments may be implemented free of scanning the ultrasonic probe over domain of interest in a point-by-point manner, and the transmitted guided waves may be used to rapidly screen the component part (or the bolt), achieving 100% coverage of the component part thickness (or the bolt thickness). Moreover, the chosen torsional guided mode may be non-dispersive throughout its propagation so that the received signals are simpler to interpret.

From the perspective of hardware, the commercially available transducers cannot provide sufficient contact with the end surface of the component part (or the bolt head) of complex shape (e.g. with internal hex socket), and consequently the guided wave modes may be difficult to generate. Various embodiments use discrete piezoelectric elements (or piezoelectric transduction elements) to produce in-phase shear motion, matching the cross-sectional particle displacement (i.e. mode shape) of the fundamental torsional mode, so that the mode may be effectively excited in the component part (or the bolt). Without loss of generality, such ultrasonic sensor or transducer configuration may provide the flexibility in the transducer configuration, and specific guided mode may be launched in the structure of the component part with even more complicated accessible geometry if the applied stresses align well with associated mode shapes.

Furthermore, the conventional ultrasonic testing and the use of commercial transducers make it difficult to realize the SHM purposes. Various embodiments allows for the feasibility of permanently attaching the sensors or the transducers to in-service component parts (or structural bolts) and ease of periodic data acquisition to regularly monitor the health condition of the component parts (or the bolts).

Various embodiments use fundamental torsional guided wave for the long-range inspection of component parts (or structural bolts). FIG. 1A and FIG. 1B illustrate the phase and group velocity dispersion curves for guided modes in a steel cylindrical rod. The phase and group velocity dispersion curves for a steel cylindrical rod are shown in FIG. 1A and FIG. 1B as a function of the frequency-radius product. As shown, below 1 MHz-mm only three modes may propagate in the rod: $L(0,1)$ mode (the lowest order longitudinal mode with extensional behaviour), $F(1,1)$ mode (the fundamental flexural mode with non-axially symmetric bending motion), and $T(0,1)$ mode (the lowest order torsional mode with particle displacement primarily in the circumference direction). These modes may be analogous to $S_0$ (symmetric), $A_0$ (antisymmetric), and $SH_0$ (share-horizontal) mode in the flat plate, respectively. To track the modes existing in cylindrical systems, a dual index naming is commonly used. The first index refers to the circumferential order of the mode, which describes the integer number of wavelengths around the circumference of the cylinder, and the second index is a counter variable which indicates the consecutive order of the mode in its wave family.

It may be seen from FIG. 1A and FIG. 1B that the $F(1,1)$ mode is highly dispersive and is thus not favourable for NDT/SHM purposes, while the $L(0,1)$ mode processes relatively small dispersion at lower frequencies, and the $T(0,1)$ mode is completely non-dispersive at all frequencies. Thus, the $L(0,1)$ mode may have the potential to be employed for inspection in relatively little-dispersive regimes, below 0.8 MHz-mm. These low frequencies may suffer little attenuation and thus may propagate long axial distances without significant loss of signal strength. Meanwhile, far fewer propagating guided modes exist at low frequency regime, which may make excitation of the chosen guided mode much easier without exciting other unwanted wave modes that may significantly complicate the received signals. The $T(0,1)$ mode may have similar advantage to the $L(0,1)$ mode in terms of ease of excitation, and may propagate with much lower phase velocity, which means the $T(0,1)$ mode may have a shorter wavelength than the $L(0,1)$ mode at a given frequency, often making it more sensitive to defects. Moreover, the non-dispersive nature of the $T(0,1)$ mode may offer wider frequency range to operate at when rendering the wavelength as small as possible in actual testing. Various embodiments therefore may use the fundamental torsional mode $T(0,1)$ for the component part (or bolt) inspection.

Figures 2A, 2B:
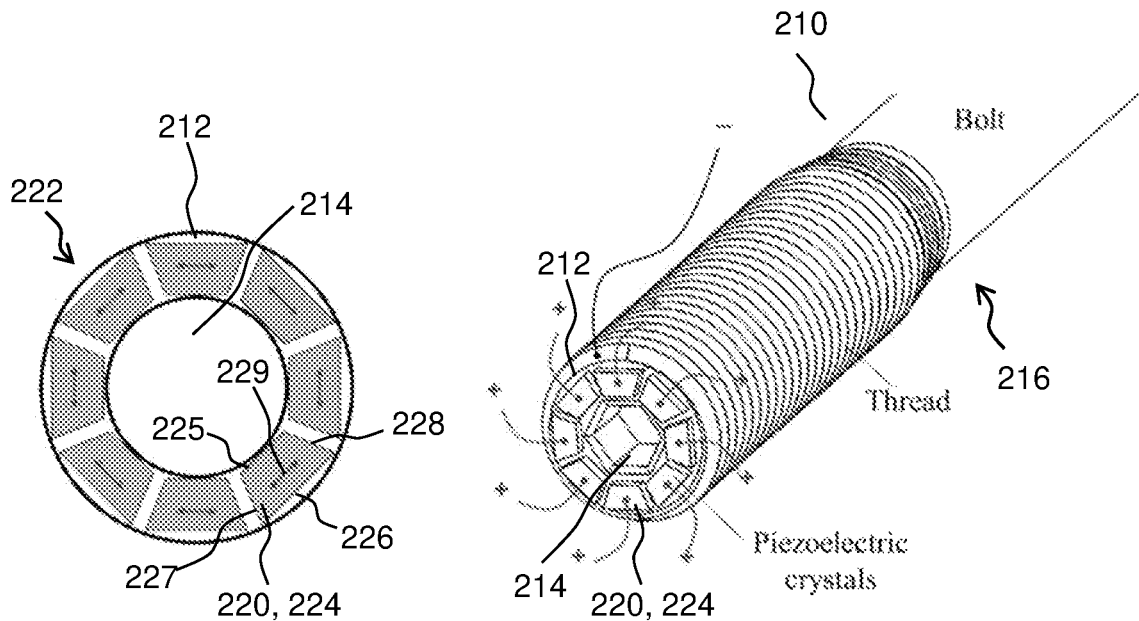
FIG. 2A and FIG. 2B shows an arrangement of piezoelectric transduction elements on a component part according to various embodiments.

Various embodiments uses a spatial ring array of piezoelectric patches (or piezoelectric transduction elements) to excite the desired fundamental torsional mode. FIG. 2A and FIG. 2B shows an arrangement of piezoelectric transduction elements 220 on a component part 210 according to various embodiments, where the array of piezoelectric elements 220 (or piezoelectric transduction elements) may be attached to an end surface 212 of the component part 220 (or the head of the bolt) with an internal hex socket 214. The piezoelectric transduction elements 220 may be trapezoid shaped piezoelectric transduction elements. All the piezoelectric transduction elements 220 may be connected in parallel and may produce in-phase shear motions subjected to an electric filed applied on each piezoelectric transduction element 220.

With aligned torsional stresses on the end surface 212 of the component part 210 (or the bolt head), the torsional guided waves may thus be generated and propagate through a body 216 of the component part 210 (or thread roots and shank regions of the bolt). In FIG. 2A, the shear motion of the respective piezoelectric transduction elements 220 is illustrated by arrow 229.

Figure 2C:
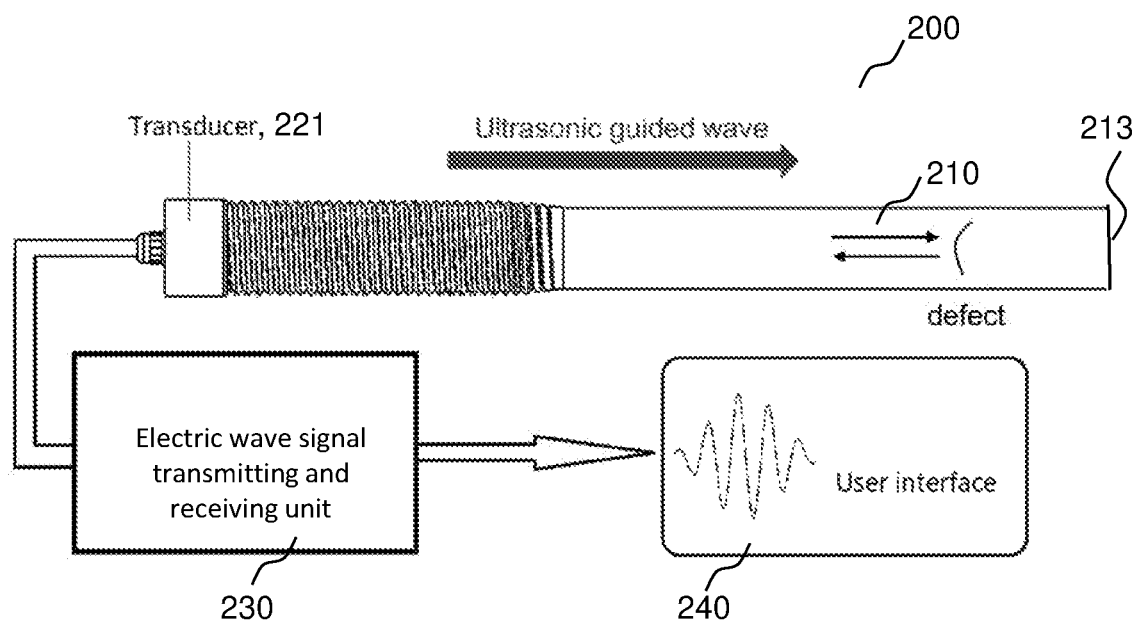
FIG. 2C schematically shows an arrangement for non-destructive testing of the component part according to various embodiments.

FIG. 2C schematically shows an arrangement 200 for non-destructive testing of the component part 210 according to various embodiments (or the embodiment of an ultrasonic guided wave system for the bolt inspection). As previously described, the transducer 221, which includes the piezoelectric transduction elements 220 and which may be coupled to the end surface 212 of the component part 210 (or the head of the test bolt), may be driven by an electric wave signal transmitting and receiving unit 230 (or an ultrasonic pulser/receiver unit), which may be operating in the pulse-echo configuration. Due to the non-dispersive nature, the excited fundamental torsional guided mode (or the structure-borne wave) may propagates along the component part 210 (or the bolt structure) at a constant group velocity $V_{gr}$. Defects occurring on the surface or deep inside the component part 210 (or the bolt) may reflect part of the wave energy, and the reflection wave (or the response wave) may be captured by the same transducer 221. An user interface 240 may then visualizes the recorded time trace to determine the arrival time ($t_{arr}$) of the reflected wave (or the response wave), and the distance between the defect and the end surface 212 of the component part 210 (or the bolt head) may be obtained as $d=V_{gr}t_{arr}/2$.

As shown, according to various embodiments, the arrangement 200 for non-destructive testing of the component part 210 may include the component part 210 to be tested. According to various embodiments, the component part 210 may be a structural connection component part or a structural bolt or a bolt. Accordingly, the component part 210 may be an elongated part which extend along a longitudinal axis. According to various embodiments, the component part 210 may include a solid cylindrical body. According to various embodiments, the component part 210 may include a first end surface 212 and a second end surface 213 opposite the first end surface 212. Accordingly, the first end surface 212 and the second end surface 213 of the component part 210 may be formed by respective first and second axial end surfaces of the elongated part.

According to various embodiments, the arrangement 200 may further include a plurality of discrete piezoelectric transduction elements 220 arranged in a circular array 222 on the first end surface 212 of the component part 210. Accordingly, the plurality of discrete piezoelectric transduction elements 220 may be arranged at the first axial end surface of the elongated part. According to various embodiments, the circular array 222 may be in the shape of a ring formed by placing or lining the plurality of discrete piezoelectric transduction elements 220 in a manner so as to place the last element next to the first element such that the plurality of discrete piezoelectric transduction elements 220 is arranged in a continuous circular closed loop.

According to various embodiments, the arrangement 200 may further include the electric wave signal transmitting and receiving unit 230 electrically coupled or electrically connected to the plurality of discrete piezoelectric transduction elements 220. Accordingly, the electric wave signal transmitting and receiving unit 230 may communicate electrically with the plurality of discrete piezoelectric transduction elements 220. According to various embodiments, the electric wave signal transmitting and receiving unit 230 may be able to generate an electric excitation wave signal and to apply the said electric excitation wave signal to the piezoelectric transduction elements 220. Accordingly, the electric wave signal transmitting and receiving unit 230 may send the electric excitation wave signal to the piezoelectric transduction elements 220 to excite the piezoelectric transduction elements 220. According to various embodiments, the electric wave signal transmitting and receiving unit 230 may be able to receive an electric response wave signal from the piezoelectric transduction elements 220 and to process the said electric response wave signal. Accordingly, the piezoelectric transduction elements 220 may return the electric response wave signal to the electric wave signal transmitting and receiving unit 230 for processing.

According to various embodiments, the electric wave signal transmitting and receiving unit 230 may be understood as any kind of an electronic devices or an electrical circuitry that is configured to generate electric excitation wave signal and/or configured to receive and process electric response wave signal. The electric wave signal transmitting and receiving unit 230 may include a combination or two or more functional circuits such as a power supply circuit, an oscillator circuit, an amplifier circuit, a signal processing circuit, etc.

According to various embodiments, the piezoelectric transduction elements 220 may be configured and arranged to deform, upon an application of the electric excitation wave signal, in an in-phase shearing motion parallel to the first end surface 212 of the component part 210 and in respective tangential direction with respect to the circular array 222. Accordingly, each piezoelectric transduction element 220 may be configured to shear when excited by the electric excitation wave signal. The piezoelectric transduction elements 220 may also be arranged such that respective direction of the respective shearing motion may be parallel to the first end surface 212 of the component part 210. Further, the respective direction of the respective shearing motion of each piezoelectric transduction element 220 may be tangent to respective location of the respective piezoelectric transduction element 220 along a circumference of the circular array 222. According to various embodiments, the deformation of the piezoelectric transduction elements 220 may generate a corresponding structure-borne wave in the component part 210 at the first end surface 212 thereof such that that said structure-borne wave can travel from the first end surface 212 to the second end surface 213 so as to be reflected by the second end surface 213 and returned as a response wave from the second end surface 213 to the first end surface 212. Accordingly, the shearing motion of the piezoelectric transduction elements 220 may convert the electric excitation wave signal into wave energy in the form of the structure-borne wave which is propagated from the first end surface 212 to the second end surface 213 through the component part 210, guided by and confined in the geometric boundaries of the component part 210. At least a portion of the structure-borne wave may then be reflected by the second end surface 213 of the component part 210 as the response wave which travels back from the second end surface 213 of the component part 210 to the first end surface 212 of the component part. According to various embodiments, the component part 210 may be the elongated part. Accordingly, the structure-borne wave may propagate from the first axial end surface of the elongated part to the second axial end surface of the elongated part along a length of the elongated part, and the response wave may travel from the second axial end surface of the elongated part back to the first axial end surface of the elongated part along the length of the elongated part.

According to various embodiments, the response wave may be received and correspondingly converted by the piezoelectric transduction elements 220 into the electric response wave signal to be received and processed by the electric wave signal transmitting and receiving unit 230. Accordingly, the response wave may be received by the piezoelectric transduction elements 220 through the first end surface 212 of the component part 210. Further, the piezoelectric transduction elements 220 may convert the wave energy of the response wave into the electric response wave signal which is then received by the electric wave signal transmitting and receiving unit 230.

According to various embodiments, a defect in the component part 210 may cause a small portion of the structure-borne wave to be reflected earlier than the remaining structure-borne wave reflected by the second end surface 213 of the component part 210. Accordingly, the response wave may additionally include wave energy reflected by the defects in the component part 210. Due to the difference in timing of the reflection, the response wave from the defects may be returned earlier than the response wave from the second end surface 213 of the component part 210.

According to various embodiments, the electric wave signal transmitting and receiving unit 230 may be configured to generate the electric excitation wave signal with such a frequency that the correspondingly created structure-borne wave is an ultrasonic wave. Accordingly, an ultrasonic guided wave may be propagated through the component part 220 by the piezoelectric transduction elements 220 for the testing of the component part 220.

According to various embodiments, the plurality of discrete piezoelectric transduction elements 220 may be electrically coupled or electrically connected to each other so as to deform together in a synchronous manner upon the application of the electric excitation wave signal. According to various embodiments, the plurality of discrete piezoelectric transduction elements may be electrically coupled or electrically connected to each other in parallel. Accordingly, the electric excitation wave signal may be applied to all the piezoelectric transduction elements 220 at the same time such that in-phase shearing motion of the plurality of discrete piezoelectric transduction elements 220 may be achieved.

According to various embodiments, the piezoelectric transduction elements 220 may be coupled to the first end surface 212 of the component part 210 via adhesive or bonding or mechanical fixing together with an application of ultrasound transmissive couplant therebetween. Accordingly, efficient energy transfer between the piezoelectric transduction elements 220 and the component part 210 may be facilitated through the connection.

Figure 3:
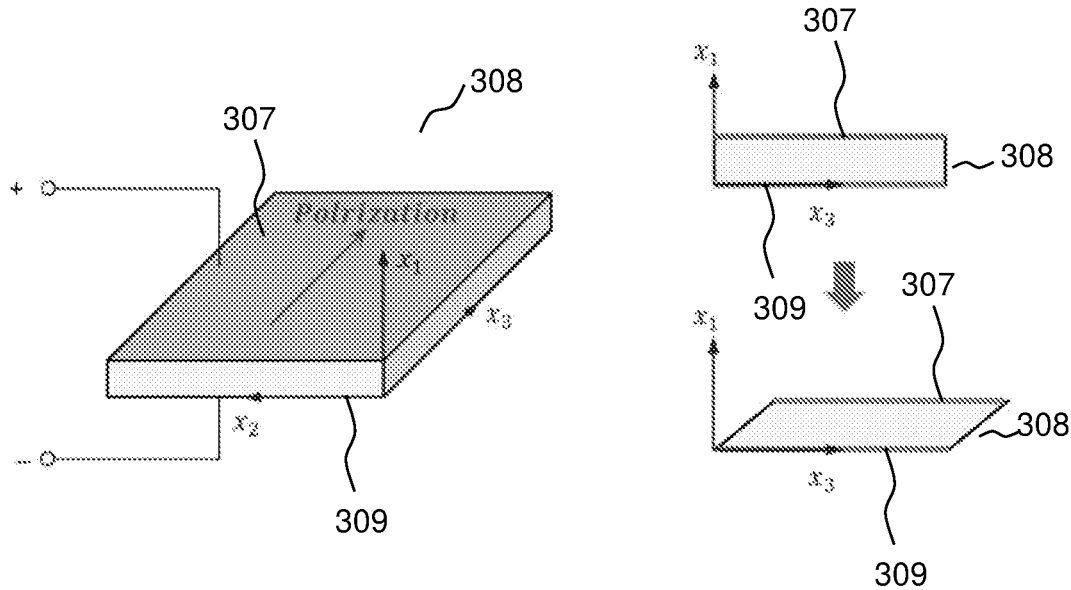
FIG. 3 shows a polarized piezoelectric ceramic plate with electrodes on the top and bottom surfaces according to various embodiments.

FIG. 3 shows a piezoelectric ceramic plate 308 polarized along the $x_3$ direction with electrodes 307, 309 on the top and bottom surfaces of the piezoelectric ceramic plate 308. As shown, the $x_3$ direction is in a plane parallel to the top and bottom surfaces which the electrodes 307, 309 are attached on. According to various embodiments, the thickness-shear mode PZT-5H wafer may be used, which possesses high $d_{15}$ piezoelectric coupling coefficient (subjected to the IEEE Standard on piezoelectricity) in order to generate a pure shear motion when the electric field is applied along $x_1$ direction. As shown, the $x_1$ direction is perpendicular to the top and bottom surfaces of the piezoelectric ceramic plate 308. According to various embodiments, the piezoelectric ceramic plate 308 may then be cut into trapezoids of required dimensions to be used as the piezoelectric transduction elements 220.

According to various embodiments, the piezoelectric transduction elements 220 each may include a reference surface and the electric excitation wave signal may be applied via a corresponding electric potential across respective piezoelectric transduction element 220 in a direction perpendicular to said reference surface so as to deform the respective piezoelectric transduction element 220 in respective shearing motion. Accordingly, the electric potential may be applied through the respective piezoelectric transduction element 220 from the respective reference surface to a corresponding further surface of the respective piezoelectric transduction element 220 which is opposite the respective reference surface.

According to various embodiments, the piezoelectric transduction elements 220 each may include at least a pair of electric contact structures to receive the electric potential and one of said electric contact structures may be disposed on said reference surface. According, at least a pair of electric contact structures may be provided to each piezoelectric transduction element 220 such that the electric potential may be applied to the respective piezoelectric transduction element 220.

According to various embodiments, said pair of electric contact structures may include a pair of planar electrodes (for example electrodes 307, 309). Accordingly, each piezoelectric transduction element 220 may include at least a pair of planar electrodes. According to various embodiments, one of said planar electrodes may be disposed on said reference surface of the respective piezoelectric transduction element 220 and a second of said planar electrodes may be disposed on the further surface of the respective piezoelectric transduction element 220 which is opposite the reference surface. Accordingly, the at least one pair of planar electrodes of the respective piezoelectric transduction element 220 may be on opposite surfaces of the respective piezoelectric transduction element 220 so as to sandwich the piezoelectric material therebetween.

According to various embodiments, the reference surface of the respective piezoelectric transduction element 220 may be parallel to the first-end surface 212 of the component part 210. Accordingly, the electric potential applied across respective piezoelectric transduction element 220 may be perpendicular to the first-end surface 212 of the component part 210. According to various embodiments, the pair of electric contact structures of respective piezoelectric transduction element 220 may be disposed on surfaces of the respective piezoelectric transduction element 220 which are parallel to the first-end surface 212 of the component part 210. According to various embodiments, the pair of planar electrodes on the respective piezoelectric transduction element 220 may be parallel to the first-end surface 212 of the component part 210.

According to various embodiments, the reference surface of the respective piezoelectric transduction element 220 may be a mating surface of the respective piezoelectric transduction element 220 which is attached or adhered or fixed or bound to the first-end surface 212 of the component part 210 so as to be in direct contact with the first-end surface 212 of the component part 210. According to various embodiments, a first of the pair of planar electrodes of respective piezoelectric transduction element 220 may be disposed on the mating surface of the respective piezoelectric transduction element 220. Accordingly, the respective piezoelectric transduction element 220 may be attached or adhered or fixed or bound to the first-end surface 212 of the component part 210 with the first of the pair of planar electrodes in direct contact with the first-end surface 212 of the component part 210. According to various embodiments, a second of the pair of planar electrodes of respective piezoelectric transduction element 220 may be disposed on a surface of the respective piezoelectric transduction element 220 that is opposite the mating surface of the respective piezoelectric transduction element 220. Accordingly, the second of the pair of planar electrodes may be exposed and directed away from the first-end surface 212 of the component part 210. According to various embodiments, the electric excitation wave signal may be applied via a corresponding electric potential across the pair of planar electrodes through the respective piezoelectric transduction element 220 in a direction perpendicular to said mating surface so as to deform the respective piezoelectric transduction element 220 in respective shearing motion.

Referring back to FIG. 2A and FIG. 2B, according to various embodiments, the piezoelectric transduction elements 220 each may be a trapezoid shaped piezoelectric transduction element 224. Accordingly, each piezoelectric transduction elements 220 may be a 4-sided flat shape with a pair of opposite parallel sides 225, 226 and two other sides 227, 228 that are not parallel to each other. The pair of opposite parallel sides 225, 226 may be of different length. Accordingly, a shorter of the pair of opposite parallel sides may be a shorter base 225, and a longer of the pair of opposite parallel sides may be a longer base 226. According to various embodiments, respective trapezoid shaped piezoelectric transduction element 224 may be oriented with respective shorter base 225 thereof directed towards a center 223 of the circular array 222. According to various embodiments, the piezoelectric transduction elements 220 may include other shape such as a rectangle, a square, a triangle, a parallelogram, a rhombus, an arrowhead shape, or any other suitable shapes.

According to various embodiments, the number of piezoelectric transduction elements 220 (or piezo-ceramic patches) used as well as dimensions of each piezoelectric transduction elements 220 (or patch) may be determined so as not to impact on the purity of the excited wave mode and the wave transmission efficiency. According to various embodiments, multiple piezoelectric transduction elements 220 (or piezo-ceramic patches) along the circumference may stress the end surface 212 of the component part 210 (or the bolt head) in the tangential direction, and the fundamental torsional mode may be well excited only when the applied stresses match well with its cross-sectional mode shape.

Figure 4A:
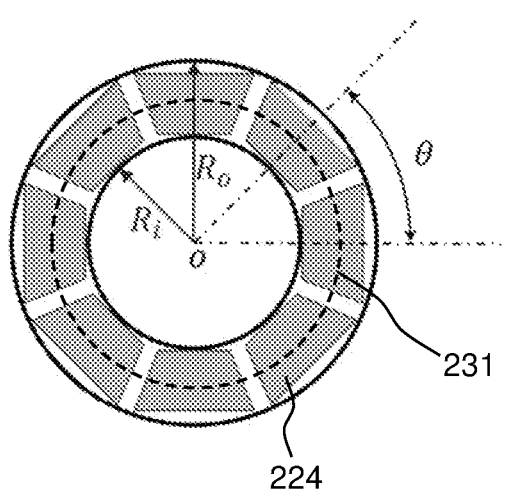
FIG. 4A and FIG. 4B show the configuration and dimensions of the trapezoid shaped piezoelectric transduction element used in the various embodiment.
Figure 4B:
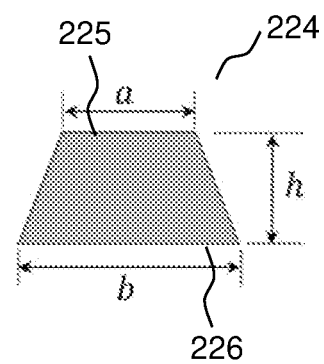

FIG. 4A and FIG. 4B show the configuration and dimensions of the trapezoid shaped piezoelectric transduction element 224 used in the various embodiment. As shown, the transduction area may be constrained by the circular inner and outer boundaries with the radii being $R_i$ and $R_o$, respectively. The number of trapezoid shaped piezoelectric transduction elements 224 (or piezoelectric transduction element or piezoelectric patches or patches or piezoelectric elements) used to discretize the circle (N) may be determined by the separation angle ($\theta$): $N=2\pi/\theta$. If too few trapezoid shaped piezoelectric transduction element 224 are used for excitation (e.g. $N \leq 4$), flexural guided modes may be easily generated together with the desired torsional mode, which may complicate the post-processing of received signals and the determination of the damage or defect in the component part 210 (or the bolt). However, if the transducer include too many trapezoid shaped piezoelectric transduction element 224, the associated fabrication process, assembly, coupling as well as circuit may become more complicated. Therefore, according to various embodiments, the number of trapezoid shaped piezoelectric transduction element 224, N, may be configured or selected to achieve best trade-off between assembling complexity and the overall performance.

According to various embodiments, upon the determination of the number of trapezoid shaped piezoelectric transduction element 224 (or patch number), N, the dimensions of the respective trapezoid shaped piezoelectric transduction element 224 may mainly influence the transmission efficiency of the selected wave mode. In principle, the larger trapezoid shaped piezoelectric transduction elements 224 used, the higher amplitude of the T(0,1) mode may be transmitted. Thus, the contact area between the trapezoid shaped piezoelectric transduction element 224 and the first end surface 212 of the component part 210 (or the bolt head) may be maximized to achieve the highest transmission magnitude for a given excitation voltage. In the various embodiment, according to the geometric relation, the following guideline may be recommended for choosing proper height (h) and the base lengths (a and b) of the trapezoid shaped piezoelectric transduction elements (or the trapezoid piezo-ceramic elements):

(i) $h \leq \xi(R_o - R_i)$, where $\xi = 0.8 \sim 0.9$ is the clearance correction factor;

(ii) $b \leq 2\sqrt{R_o^2 - R_i^2 - 2R_i h - h^2}$;

(iii) $a < \pi(R_o - R_i)/N < b$.

According to various embodiments, these guidelines may facilitate achieving a balance and robust configuration for the trapezoid shaped piezoelectric elements 224.

Referring to FIG. 2A, FIG. 2B and FIG. 4A, according to various embodiments, the first end surface 212 of the component part 210 may include an annular-like-shaped surface. Accordingly, the first end surface 212 of the component part 210 may include a centre cavity or socket (e.g. internal hex socket) such that the first end surface 212 may of an annular-like-shaped surface.

Referring to guideline (i) above and referring to FIG. 4A and FIG. 4B, according to various embodiments, a ratio of a perpendicular distance between the shorter base 225 and the longer base 226 of the respective trapezoid shaped piezoelectric transduction element 224 to a difference between a radius, $R_o$, of an outer circumference of the annular-like-shaped surface and a radius, $R_i$, of an inner circumference of the annular-like shaped surface may be between 0.8 to 0.9.

Referring to guideline (ii) above and referring to FIG. 4A and FIG. 4B, according to various embodiments, a length ('b') of the longer base 226 of respective trapezoid shaped piezoelectric transduction element 224 may be obtained via Pythagoras' theorem using the radius, $R_o$, of the outer circumference of the annular-like shaped surface as a hypothenuse, a sum of the perpendicular distance of respective trapezoid shaped transduction element 224 and the radius, $R_i$, of the inner circumference of the annular-like shaped surface as a first side, and half the length ('b') of the longer base 226 of the respective trapezoid shaped transduction element as a second side.

Referring to guideline (iii) above and referring to FIG. 4A and FIG. 4B, according to various embodiments, a sum of the length ('a') of the shorter base 225 of all the trapezoid shaped piezoelectric transduction elements 224 may be less than a reference circumference 231, and a sum of the length ('b') of the longer base 226 of all the trapezoid shaped piezoelectric transduction elements 224 may be more than the reference circumference 231. According to various embodiments, the reference circumference 231 may be a circumference of a circle having a radius between the radius, $R_i$, of the inner circumference of the annular-like shaped surface and the radius, $R_o$, of the outer circumference of the annular-like-shaped surface. According to various embodiments, the radius of the reference circumference 231 may be half of the sum of the radius, $R_i$, of the inner circumference of the annular-like shaped surface and the radius, $R_o$, of the outer circumference of the annular-like-shaped surface.

According to various embodiments, the geometric constrains may be slightly relaxed when the piezoelectric transduction elements 220 (or the piezo-ceramic elements) are first bonded to a matching layer before being coupled to the first end surface 212 of the component part 210 (or the bolt head). Additionally, in various embodiment, a bonding template (with required number of cutouts, such as trapezoid cutouts) may be used to ensure the precise positioning of the piezoelectric transduction elements 220, such as the trapezoid shaped piezoelectric transduction element 224, when being bonded to the first end surface 212 of the component part 210 (or the bolt head) or to the matching layer. The template may be removed once the bond layer had been well cured, and the wires may be subsequently bonded to the electric contact structures, e.g. electrodes, of the respective piezoelectric transduction elements 220.

According to various embodiments, the piezoelectric transduction elements 220 (or the piezoelectric elements) may be combined with appropriate matching layers and backing materials, as well as associated electrodes and wires to compose a sealed transducer, which may be used to transmit and receive guided wave modes in universal cylindrical structures. According to various embodiments, such transducer may be developed for discrete NDT purposes.

Various embodiment may be packaged including permanently attached piezoelectric transduction elements 220 (or sensors or transducer), electric wave signal transmitting and receiving units 230 (or ultrasonic pulser/receiver units), associated circuit hardware, wireless data transmission, signal processing to produce a remote monitoring system to regularly assess and record the health condition of in-service bolts of other cylindrical components in the industry.

Figure 5A:
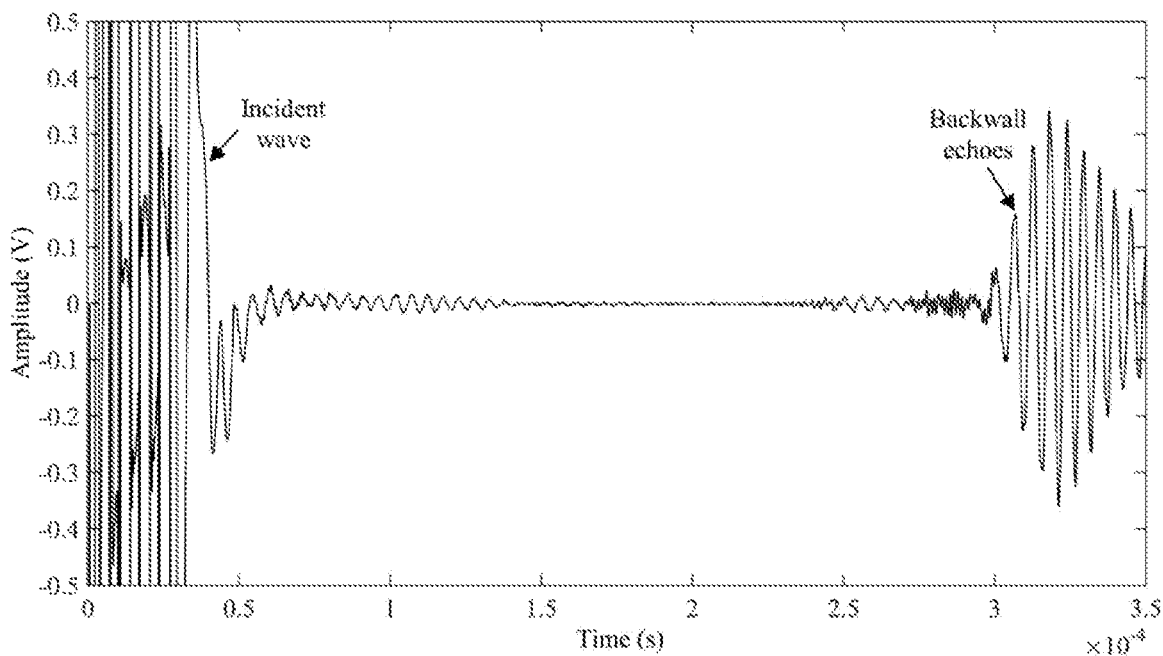
FIG. 5A shows example inspection data from a pristine bolt using the arrangement of FIG. 2C according to various embodiments.
Figure 5B:
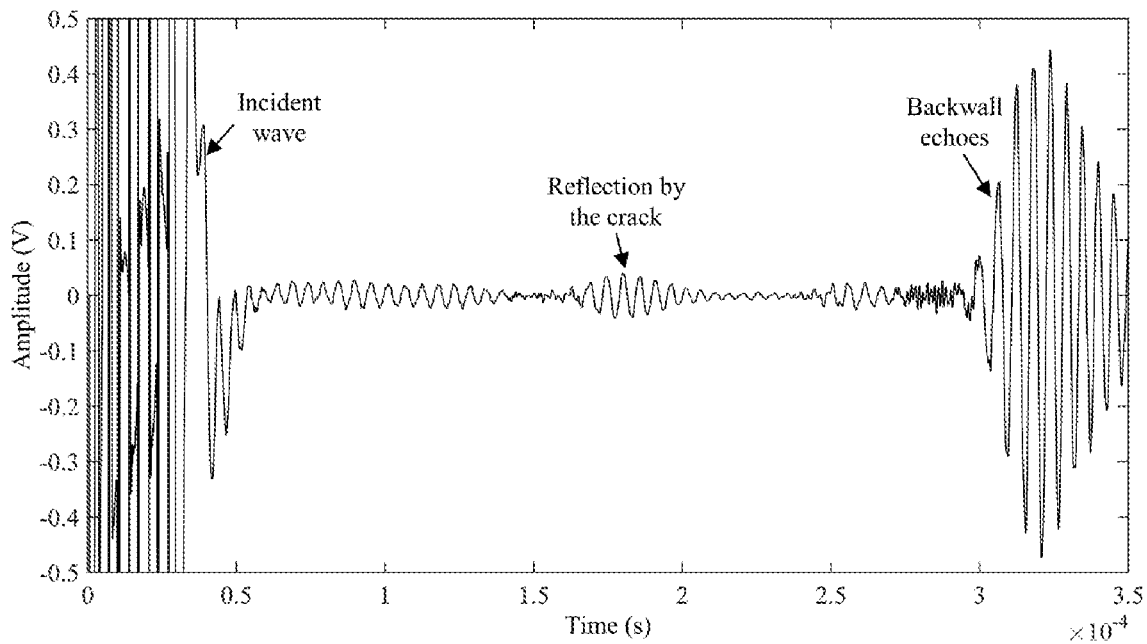
FIG. 5B shows example inspection data from a damaged bolt using the arrangement of FIG. 2C according to various embodiments.

FIG. 5A shows example time traces received from a pristine bolt (diameter: 27 mm; length: 435 mm) and FIG. 5B shows example time traces received from a damaged bolt (circumferential crack length: 13 mm; crack depth: 2 mm; located in the middle of the bolt) at an excitation frequency of 150 kHz using the arrangement 200 for non-destructive testing according to various embodiments. As an example, two separate steel bolts, in pristine and cracked states, were screened by the arrangement 200 for non-destructive testing (or the ultrasonic guided wave system) according to various embodiments. Both the bolts share the same geometry (length: 435 mm; diameter: 27 mm) and material properties, and a 13 mm-wide circumferential crack is made in the middle of one bolt with constant 2 mm depth. In the present embodiment, eight trapezoid piezo-ceramic elements are coupled to the bolt head and are excited at the center frequency of 150 kHz, and the fundamental torsional guided mode is well launched. The recorded time traces for these two test bolts are shown in FIG. 5A and FIG. 5B. As shown, in the pristine bolt, only the incident wave and backwall echo are identifiable, while the reflected wave by the crack is readily captured in the time trace measured at the head of the damaged bolt. Thus, according to various embodiments, the location of the crack in the bolt may be determined, demonstrating the defect detectability of various embodiments.

As illustrated by the above example with reference to FIG. 5A and FIG. 5B, according to various embodiments, there is provided a non-destructive testing method. The non-destructive testing method may include arranging a plurality of discrete piezoelectric transduction elements in a circular array on a first end surface of a cylindrical component part to be tested. The cylindrical component part may include the first end surface and a second end surface opposite the first end surface. According to various embodiments, the method may further include operating an electric wave signal transmitting and receiving unit electrically coupled to the plurality of discrete piezoelectric transduction elements to generate an electric excitation wave signal and to apply the said electric excitation wave signal to the piezoelectric transduction elements in a manner to deform the piezoelectric transduction elements in an in-phase shearing motion parallel to the first end surface and in respective tangential direction with respect to the circular array so as to generate a corresponding structure-borne wave in the component part at the first end surface thereof such that that said structure-borne wave can travel from the first end surface to the second end surface so as to be reflected by the second end surface and returned as a response wave from the second end surface to the first end surface. According to various embodiments, the response wave may be received and correspondingly converted by the piezoelectric transduction elements into the electric response wave signal to be received and processed by the electric wave signal transmitting and receiving unit, wherein the structure-borne wave is generated in form of a fundamental torsional guide wave.

According to various embodiments, the electric excitation wave signal may have a frequency such that the correspondingly created structure-borne wave is an ultrasonic wave.

According to various embodiments, the method may further include determining, via the electric wave signal transmitting and receiving unit, a location of a defect along a length of the cylindrical component part based on an elapsed time of a corresponding response wave of the defect. According to various embodiments, the electric wave signal transmitting and receiving unit may include a user interface from which the location of the defect may be determined.

The following pertain to various embodiments.

According to various embodiments, there is provided an arrangement for non-destructive testing of a component part, the arrangement including:

the component part to be tested, which includes a first end surface and a second end surface opposite the first end surface;

a plurality of discrete piezoelectric transduction elements arranged in a circular array on the first end surface of the component part; and an electric wave signal transmitting and receiving unit electrically coupled to the plurality of discrete piezoelectric transduction elements, and able to generate an electric excitation wave signal and to apply the said electric excitation wave signal to the piezoelectric transduction elements, and able to receive an electric response wave signal from the piezoelectric transduction elements and to process the said electric response wave signal, wherein the piezoelectric transduction elements are configured and arranged to deform, upon an application of the electric excitation wave signal, in an in-phase shearing motion parallel to the first end surface and in respective tangential direction with respect to the circular array so as to generate a corresponding structure-borne wave in the component part at the first end surface thereof such that that said structure-borne wave can travel from the first end surface to the second end surface so as to be reflected by the second end surface and returned as a response wave from the second end surface to the first end surface, which response wave can be received and correspondingly converted by the piezoelectric transduction elements into the electric response wave signal to be received and processed by the electric wave signal transmitting and receiving unit.

According to various embodiments, the electric wave signal transmitting and receiving unit may be configured to generate the electric excitation wave signal with such a frequency that the correspondingly created structure-borne wave is an ultrasonic wave.

According to various embodiments, the piezoelectric transduction elements each may include a reference surface and the electric excitation wave signal may be applied via a corresponding electric potential across respective piezoelectric transduction element in a direction perpendicular to said reference surface so as to deform the respective piezoelectric transduction element in respective shearing motion.

According to various embodiments, the piezoelectric transduction elements each may include at least a pair of electric contact structures to receive the electric potential and one of said electric contact structures is disposed on said reference surface.

According to various embodiments, said pair of electric contact structures may include a pair of planar electrodes. One of said planar electrodes may be disposed on said reference surface and a second of said planar electrodes may be disposed on a further surface of the respective piezoelectric transduction element which is opposite the reference surface.

According to various embodiments, the reference surface of the respective piezoelectric transduction element may be parallel to the first-end surface of the component part.

According to various embodiments, the reference surface may be a mating surface of the respective piezoelectric transduction elements.

According to various embodiments, the piezoelectric transduction elements each may include a mating surface and the electric excitation wave signal may be applied via a corresponding electric potential across respective piezoelectric transduction element in a direction perpendicular to said mating surface so as to deform the respective piezoelectric transduction element in respective shearing motion, wherein the mating surface may be in contact with the first end surface of the component part.

According to various embodiments, the piezoelectric transduction elements each may include at least a pair of planar electrodes to receive the electric potential, one of said planar electrodes may be disposed on said mating surface and a second of said planar electrodes may be disposed on a further surface of the respective piezoelectric transduction element which may be opposite the mating surface.

According to various embodiments, the mating surface of the respective piezoelectric transduction element may be parallel to the first-end surface of the component part.

According to various embodiments, the plurality of discrete piezoelectric transduction elements may be electrically coupled or electrically connected to each other in parallel so as to deform together in a synchronous manner upon the application of the electric excitation wave signal.

According to various embodiments, the piezoelectric transduction elements may be coupled to the first end surface of the component part via adhesive or bonding or mechanical fixing together with an application of ultrasound transmissive couplant therebetween.

According to various embodiments, the piezoelectric transduction elements each may be a trapezoid shaped piezoelectric transduction element. According to various embodiments, respective trapezoid shaped piezoelectric transduction element may be oriented with respective shorter base thereof directed towards a center of the circular array.

According to various embodiments, the first end surface of the component part may include an annular-like-shaped surface.

According to various embodiments, a ratio of a perpendicular distance between the shorter base and a longer base of the respective trapezoid shaped piezoelectric transduction element to a difference between a radius of an outer circumference of the annular-like-shaped surface and a radius of an inner circumference of the annular-like shaped surface may be between 0.8 to 0.9.

According to various embodiments, a length of the longer base of respective trapezoid shaped piezoelectric transduction element may be obtained via Pythagoras' theorem using the radius of the outer circumference of the annular-like shaped surface as a hypotenuse, a sum of the perpendicular distance of respective trapezoid shaped transduction element and the radius of the inner circumference of the annular-like shaped surface as a first side, and half the length of the longer base of the respective trapezoid shaped transduction element as a second side.

According to various embodiments, a sum of a length of the shorter base of all the trapezoid shaped piezoelectric transduction elements may be less than a reference circumference, and a sum of the length of the longer base of all the trapezoid shaped piezoelectric transduction elements may be more than the reference circumference, wherein a radius of the reference circumference may be half of the sum of the radius of the inner circumference of the annular-like shaped surface and the radius of the outer circumference of the annular-like-shaped surface.

According to various embodiments, the component part may include a solid cylindrical body.

According to various embodiments, the arrangement may form a structural connection component. According to various embodiments, the component part may be an elongated part, optionally a bolt, which may extend along a longitudinal axis. According to various embodiments, the first and second end surfaces may be formed by first and second axial end surfaces of the elongated part.

According to various embodiments, there is provided a non-destructive testing method, the method including:
arranging a plurality of discrete piezoelectric transduction elements in a circular array on a first end surface of a cylindrical component part to be tested, which includes the first end surface and a second end surface opposite the first end surface; and
operating an electric wave signal transmitting and receiving unit electrically coupled to the plurality of discrete piezoelectric transduction elements to generate an electric excitation wave signal and to apply the said electric excitation wave signal to the piezoelectric transduction elements in a manner to deform the piezoelectric transduction elements in an in-phase shearing motion parallel to the first end surface and in respective tangential direction with respect to the circular array so as to generate a corresponding structure-borne wave in the component part at the first end surface thereof such that said structure-borne wave can travel from the first end surface to the second end surface so as to be reflected by the second end surface and returned as a response wave from the second end surface to the first end surface, which response wave can be received and correspondingly converted by the piezoelectric transduction elements into the electric response wave signal to be received and processed by the electric wave signal transmitting and receiving unit, wherein the structure-borne wave is generated in form of a fundamental torsional guide wave According to various embodiments, the electric excitation wave signal may have a frequency such that the correspondingly created structure-borne wave may be a guided ultrasonic wave.

According to various embodiments, the method may further include determining, via the electric wave signal transmitting and receiving unit, a location of a defect along a length of the cylindrical component part based on an elapsed time of a corresponding response wave of the defect.

Various embodiments have provided an arrangement and a method which may be used for detecting and localizing the damage occurring in component parts, such as structural bolts, during the in-service use. With a damage detected in the installed component parts, such as structural bolts, they may be replaced timely, so as to avoid the damage exacerbating to be catastrophic failure of the entire system.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. An arrangement for non-destructive testing of a component part, the arrangement comprising:
   the component part to be tested, which includes a first end surface and a second end surface opposite the first end surface;
   a plurality of discrete piezoelectric transduction elements arranged in a circular array on the first end surface of the component part; and
   an electric wave signal transmitting and receiving unit electrically coupled to the plurality of discrete piezoelectric transduction elements, and able to generate an electric excitation wave signal and to apply the said electric excitation wave signal to the piezoelectric transduction elements, and able to receive an electric response wave signal from the piezoelectric transduction elements and to process the said electric response wave signal,
   wherein the piezoelectric transduction elements are configured and arranged to deform, upon an application of the electric excitation wave signal, in an in-phase shearing motion parallel to the first end surface and in respective tangential direction with respect to the circular array so as to generate a corresponding structure-borne wave in the component part at the first end surface thereof such that that said structure-borne wave can travel from the first end surface to the second end surface so as to be reflected by the second end surface and returned as a response wave from the second end surface to the first end surface, which response wave can be received and correspondingly converted by the piezoelectric transduction elements into the electric response wave signal to be received and processed by the electric wave signal transmitting and receiving unit,
   wherein the piezoelectric transduction elements each is a trapezoid shaped piezoelectric transduction element, and wherein respective trapezoid shaped piezoelectric transduction element is oriented with respective shorter base thereof directed towards a center of the circular array,
   wherein the first end surface of the component part comprises an annular-like-shaped surface, and
   wherein a ratio of a perpendicular distance between the shorter base and a longer base of the respective trapezoid shaped piezoelectric transduction element to a difference between a radius of an outer circumference of the annular-like-shaped surface and a radius of an inner circumference of the annular-like shaped surface is between 0.8 to 0.9.

2. The arrangement as claimed in claim 1, wherein the electric wave signal transmitting and receiving unit is configured to generate the electric excitation wave signal with such a frequency that the correspondingly created structure-borne wave is an ultrasonic wave.

3. The arrangement as claimed in claim 1, wherein the piezoelectric transduction elements each comprises a mating surface and the electric excitation wave signal is applied via a corresponding electric potential across respective piezoelectric transduction element in a direction perpendicular to said mating surface so as to deform the respective piezoelectric transduction element in respective shearing motion, wherein the mating surface is in contact with the first end surface of the component part.

4. The arrangement as claimed in claim 3, wherein the piezoelectric transduction elements each comprises at least a pair of planar electrodes to receive the electric potential, one of said planar electrodes is disposed on said mating surface and a second of said planar electrodes is disposed on a further surface of the respective piezoelectric transduction element which is opposite the mating surface.

5. The arrangement as claimed in claim 3, wherein the mating surface of the respective piezoelectric transduction element is parallel to the first-end surface of the component part.

6. The arrangement as claimed in claim 3, wherein the plurality of discrete piezoelectric transduction elements is electrically coupled to each other in parallel so as to deform together in a synchronous manner upon the application of the electric excitation wave signal.

7. The arrangement as claimed in claim 1, wherein the plurality of discrete piezoelectric transduction elements is electrically coupled to each other in parallel so as to deform together in a synchronous manner upon the application of the electric excitation wave signal.

8. The arrangement as claimed in claim 1, wherein the piezoelectric transduction elements are coupled to the first end surface of the component part via adhesive or bonding or mechanical fixing together with an application of ultrasound transmissive couplant therebetween.

9. The arrangement as claimed in claim 1, wherein a length of the longer base of respective trapezoid shaped piezoelectric transduction element is obtained via Pythagoras' theorem using the radius of the outer circumference of the annular-like shaped surface as a hypotenuse, a sum of the perpendicular distance of respective trapezoid shaped transduction element and the radius of the inner circumference of the annular-like shaped surface as a first side, and half the length of the longer base of the respective trapezoid shaped transduction element as a second side.

10. The arrangement as claimed in claim 9, wherein a sum of a length of the shorter base of all the trapezoid shaped piezoelectric transduction elements is less than a reference circumference, and a sum of the length of the longer base of all the trapezoid shaped piezoelectric transduction elements is more than the reference circumference, and wherein, a radius of the reference circumference is half of the sum of the radius of the inner circumference of the annular-like shaped surface and the radius of the outer circumference of the annular-like-shaped surface.

11. The arrangement as claimed in claim 1, wherein the component part comprises a solid cylindrical body.

12. The arrangement as claimed in claim 1, wherein the arrangement forms a structural connection component, wherein the component part is an elongated part, optionally a bolt, which extends along a longitudinal axis and wherein the first and second end surfaces are formed by first and second axial end surfaces of the elongated part.

13. A non-destructive testing method comprising:
arranging a plurality of discrete piezoelectric transduction elements in a circular array on a first end surface of a cylindrical component part to be tested, which includes the first end surface and a second end surface opposite the first end surface; and
operating an electric wave signal transmitting and receiving unit electrically coupled to the plurality of discrete piezoelectric transduction elements to generate an electric excitation wave signal and to apply the said electric excitation wave signal to the piezoelectric transduction elements in a manner to deform the piezoelectric transduction elements in an in-phase shearing motion parallel to the first end surface and in respective tangential direction with respect to the circular array so as to generate a corresponding structure-borne wave in the component part at the first end surface thereof such that that said structure-borne wave can travel from the first end surface to the second end surface so as to be reflected by the second end surface and returned as a response wave from the second end surface to the first end surface, which response wave can be received and correspondingly converted by the piezoelectric transduction elements into the electric response wave signal to be received and processed by the electric wave signal transmitting and receiving unit, wherein the structure-borne wave is generated in form of a fundamental torsional guide wave,
wherein the piezoelectric transduction elements each is a trapezoid shaped piezoelectric transduction element, and wherein respective trapezoid shaped piezoelectric transduction element is oriented with respective shorter base thereof directed towards a center of the circular array,
wherein the first end surface of the component part comprises an annular-like-shaped surface, and
wherein a ratio of a perpendicular distance between the shorter base and a longer base of the respective trapezoid shaped piezoelectric transduction element to a difference between a radius of an outer circumference of the annular-like-shaped surface and a radius of an inner circumference of the annular-like shaped surface is between 0.8 to 0.9.

14. The non-destructive testing method as claimed in claim 13, wherein the electric excitation wave signal has a frequency such that the correspondingly created structure-borne wave is a guided ultrasonic wave.

15. The non-destructive testing method as claimed in claim 14, further comprising determining, via the electric wave signal transmitting and receiving unit, a location of a defect along a length of the cylindrical component part based on an elapsed time of a corresponding response wave of the defect.

16. The non-destructive testing method as claimed in claim 13, further comprising determining, via the electric wave signal transmitting and receiving unit, a location of a defect along a length of the cylindrical component part based on an elapsed time of a corresponding response wave of the defect.

* * * * *